(12) United States Patent
Bostrom et al.

(10) Patent No.: US 8,677,474 B2
(45) Date of Patent: *Mar. 18, 2014

(54) DETECTION OF ROGUE CLIENT-AGNOSTIC NAT DEVICE TUNNELS

(75) Inventors: Paul S. Bostrom, Austin, TX (US);
Jason J. Jaramillo, Austin, TX (US);
Tommy L. McLane, Hutto, TX (US);
Eduardo L. Reyes, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,921

(22) Filed: Jul. 25, 2012

(65) Prior Publication Data

US 2012/0331544 A1    Dec. 27, 2012

Related U.S. Application Data

(63) Continuation of application No. 13/169,163, filed on Jun. 27, 2011.

(51) Int. Cl.
*G06F 9/00* (2006.01)
(52) U.S. Cl.
USPC .......................................................... 726/13

(58) Field of Classification Search
USPC .......................................................... 726/13
See application file for complete search history.

(56) References Cited

U.S. PATENT DOCUMENTS

| | | | |
|---|---|---|---|
| 5,898,830 A * | 4/1999 | Wesinger et al. | 726/15 |
| 6,792,546 B1 | 9/2004 | Shanklin et al. | |
| 6,985,920 B2 * | 1/2006 | Bhattacharya et al. | 709/200 |
| 7,222,366 B2 * | 5/2007 | Bruton et al. | 726/23 |
| 7,386,628 B1 * | 6/2008 | Hansell et al. | 709/238 |
| 7,913,294 B1 * | 3/2011 | Maufer et al. | 726/3 |
| 8,219,675 B2 * | 7/2012 | Ivershen | 709/224 |
| 2005/0177871 A1 | 8/2005 | Roesch et al. | |
| 2006/0288418 A1 | 12/2006 | Yang et al. | |
| 2007/0053289 A1 | 3/2007 | March et al. | |
| 2009/0138945 A1 | 5/2009 | Savchuk | |
| 2009/0254990 A1 | 10/2009 | McGee | |
| 2010/0161795 A1 * | 6/2010 | Deridder et al. | 709/224 |

* cited by examiner

*Primary Examiner* — Krisna Lim
(74) *Attorney, Agent, or Firm* — Matthew B. Talpis; Gregory K. Goshorn; Greg Goshorn, P.C.

(57) ABSTRACT

Provided are techniques for the prevention of certain types of attacks on computing systems. The current disclosure, which describes one particular type of attack, is directed to the detection and prevention of an attack rather than the mechanics of the particular described attack. The claimed subject matter both detects and prevents an attack without exposing a network to denial-of-service (DoS) attacks by being too restrictive.

7 Claims, 4 Drawing Sheets

DETECTION OF ROGUE CLIENT-AGNOSTIC NAT DEVICE TUNNELS

CROSS-REFERENCES TO RELATED APPLICATIONS

The present application is a continuation and claims the benefit of the filing date of an application entitled, "Detection of Rogue Client-Agnostic NAT Device Tunnels" Ser. No. 13/169,163, filed Jun. 27, 2011, assigned to the assignee of the present application, and herein incorporated by reference.

BACKGROUND OF THE INVENTION

The claimed subject matter relates generally to computer security and, more specifically, to techniques for the prevention of certain types of attacks on computing systems.

As computer have become more interconnected, network security becomes both more difficult and important. The prevention of harm that may be associated with unauthorized access to an internal network (e.g., corporate intranet) is of critical importance.

SUMMARY

Provided are techniques for the prevention of certain types of attacks on computing systems. The current disclosure, which describes one particular type of attack, is directed to the detection and prevention of the attack. In other words, the claimed subject matter focuses on the detection and prevention of an attack rather than the mechanics of the particular described attack. The claimed subject matter both detects and prevents the attack scenario described below without exposing a network to denial-of-service (DoS) attacks by being too restrictive.

Provided are techniques relating to computer security, comprising examining a packet transmitted via a firewall coupled to a network to determine whether the packet is an incoming packet or an outgoing packet, wherein the packet corresponds to a source IP address, a destination IP address and a port number; if the packet is an outgoing packet, storing an indication of a potential threat corresponding to the source IP address and the port number in a table; and, if the packet is an incoming packet, correlating the destination IP address and port number with source IP address and port numbers, respectively of entries in the table; and, if the destination IP address and the port number correlate with a source IP address and port number of an entry in the table, marking all entries in the table with a source IP address corresponding to the destination IOP address as a non-treat: and, if the destination IP address and the port number do not correlate with a source IP address and port number of an entry in the table, marking all entries in the table with a source IP address corresponding to the destination IOP address as a threat.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
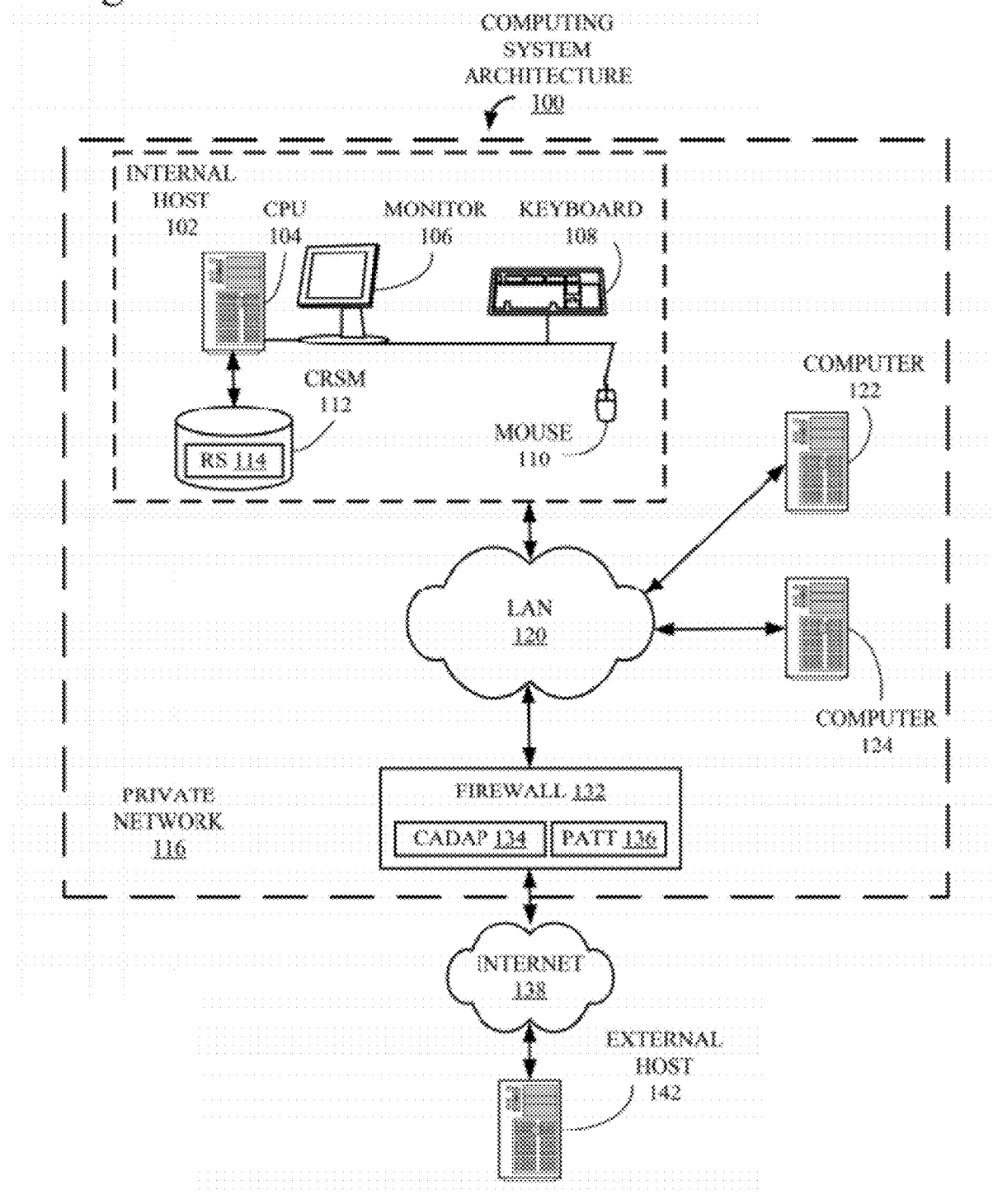
FIG. 1 is a block diagram that illustrates an example of a computing architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As the Inventors herein have realized, there exists one particular attack on firewalls in which a malicious attacker can deploy client-agnostic tunneling services within a corporate network that essentially "punch-through" the firewall and allow any client on the internet (i.e. clients which have direct access to an internet addressable IP address) to connect to the service hosted behind a corporate network's firewall. The way this is accomplished is as follows:

1. The rogue service deployed within the private corporate network creates a local socket to point to a particular server port running on the same local machine (e.g. An OpenSSH Server running locally on port 22).
2. Once this local socket connection is configured, the rogue service starts sending out periodic beacon packets to a particular host on the internet (e.g. www.google.com), on a particular remote port (e.g. port 12345). These beacon packets use UDP (user datagram protocol) on a user-defined local port (e.g. 9889). Because www.google.com does not understand these beacon packets arriving at its own public port 12345, it simply discards them.
3. These beacon packets originating from an internal IP address (e.g., distnim.austin.ibm.com/9.3.6.192) on internal UDP port 9889 get address translated via port address translation (PAT) as the packets leave the private corporate network and travel to the external host (e.g. www.google.com:12345). The resultant translated packet that arrives at www.google.com:12345 appears to originate from source address bi01p1.co.us.ibm.com: 7825, where the port '7825' is a random port number assigned by the firewall's PAT algorithm, and bi01p1.co.us.ibm.com is the hostname of IBM's internet-facing firewall.

The purpose of these beacon packets is to maintain a static position in the firewall's PAT table over time, allowing an attacker's external client to eventually guess the port position in the PAT table.

4. A malicious attacker who wishes to connect to the rogue service described above, who has direct access to an internet addressable IP address (e.g. 208.124.38.35), opens its own UDP port listener (e.g. 9889) and then starts sending multiple spoofed packets with fake source information, to the IBM firewall directly (e.g. to bi01p1.co.us.ibm.com). For example, the client will send 65534 packets each containing a separate destination port ranging from 1-65535, but all containing the same spoofed source address corresponding to www.google.com, and port '12345'. NOTE: These packets however will contain payload data that includes the real internet IP address and UDP listener port information of the malicious attacker's host located on the internet. (e.g. 208.124.38.35:9889).
5. The IBM firewall receives the spoofed packets that appear to be reply packets from google.com:12345, but because all but one of the packets received will have the wrong destination port (i.e. the random port '7825' assigned by the IBM firewall's PAT algorithm), all but one packet will be dropped by the IBM firewall.
6. The IBM firewall will however, allow the single packet containing the correct destination port of 7825 to pass through the firewall and on to the originating internal system hosting the rogue service (i.e. distnim.austin.ibm.com:9889).
7. The rogue service upon finally receiving a response packet corresponding to the many beacon packets that have been sent, will read the data contained in the packet's payload that corresponds to the malicious attacker's client machine located outside the network (e.g. real source port and real source IP address-208.124.38.35: 9889).
8. Upon extracting the real client IP and UDP port, the rogue service creates a brand new UDP connection and starts sending packets directly to the client's listener operating on port 208.124.38.35:9889.
9. Once the attacker's internet client receives these packets originating from the rogue service located behind the IBM firewall, they negotiate a handshake connection and create a firewall tunnel using UDP.
10. Once this UDP tunnel has been established, the malicious attacker is able to remotely connect from their internet host to the rogue service.

FIG. 1 is a block diagram that illustrates an example of a computing system architecture 100 that may implement the claimed subject matter. Computing system architecture includes an internal host 102. Internal host 102 includes a central processing unit (CPU), or processor, 104, coupled to a monitor 106, a keyboard 108 and a pointing device, or mouse, 110, which together facilitate human interaction with components of computing system architecture 100 and internal host 102.

Coupled to internal host 102 and attached to CPU 104 is a computer-readable storage medium (CRSM) component 112, which may either be incorporated into internal host 102 i.e. an internal device, or attached externally to internal host 102 by means of various, commonly available connection devices such as but not limited to, a universal serial bus (USB) port (not shown). CRSM 112 is illustrated storing an exemplary computer software application, which in this case is a rogue service (RS) 114. RS 114 is employed throughout the Specification as an example of an unauthorized service that is operating within a private network 116 and is attempting to establish a firewall tunnel.

Internal host 102 is coupled to a local area network (LAN) 120. A computer 122 and a computer 124 are also coupled to LAN 120. Also coupled to LAN 120 is a firewall 132, which includes a Client-agnostic Attack Detection and Prevention module (CADAP) 134 and a Port Address Translation table (PATT) 136. Together, internal host 102, computers 122 and 124, LAIN 130 and firewall 132 comprise private network 116. It should be understood that most of the illustrated components of computing system architecture 100 would also have processors, displays, keyboards and pointing devices, which, for the sake of simplicity, are not illustrated.

Firewall 132 is coupled to the Internet 138. Coupled to the interne is an external host 142. Firewall 132 provides protection to the components of the private network comprised of internal host 102, computers 122 and 124 and LAN 120 with respect to communication, or traffic, between the components 102, 122, 124 and 120 and computing devices that are not part of the private network, such as external host 142.

It should be noted that computing system architecture 100 and the various components are simple examples of an architecture that may incorporate the claimed subject matter and are used illustrative purposes only. The various components and their relationship with the claimed subject matter are described in more detail below in conjunction with FIGS. 2-4.

Figure 2:
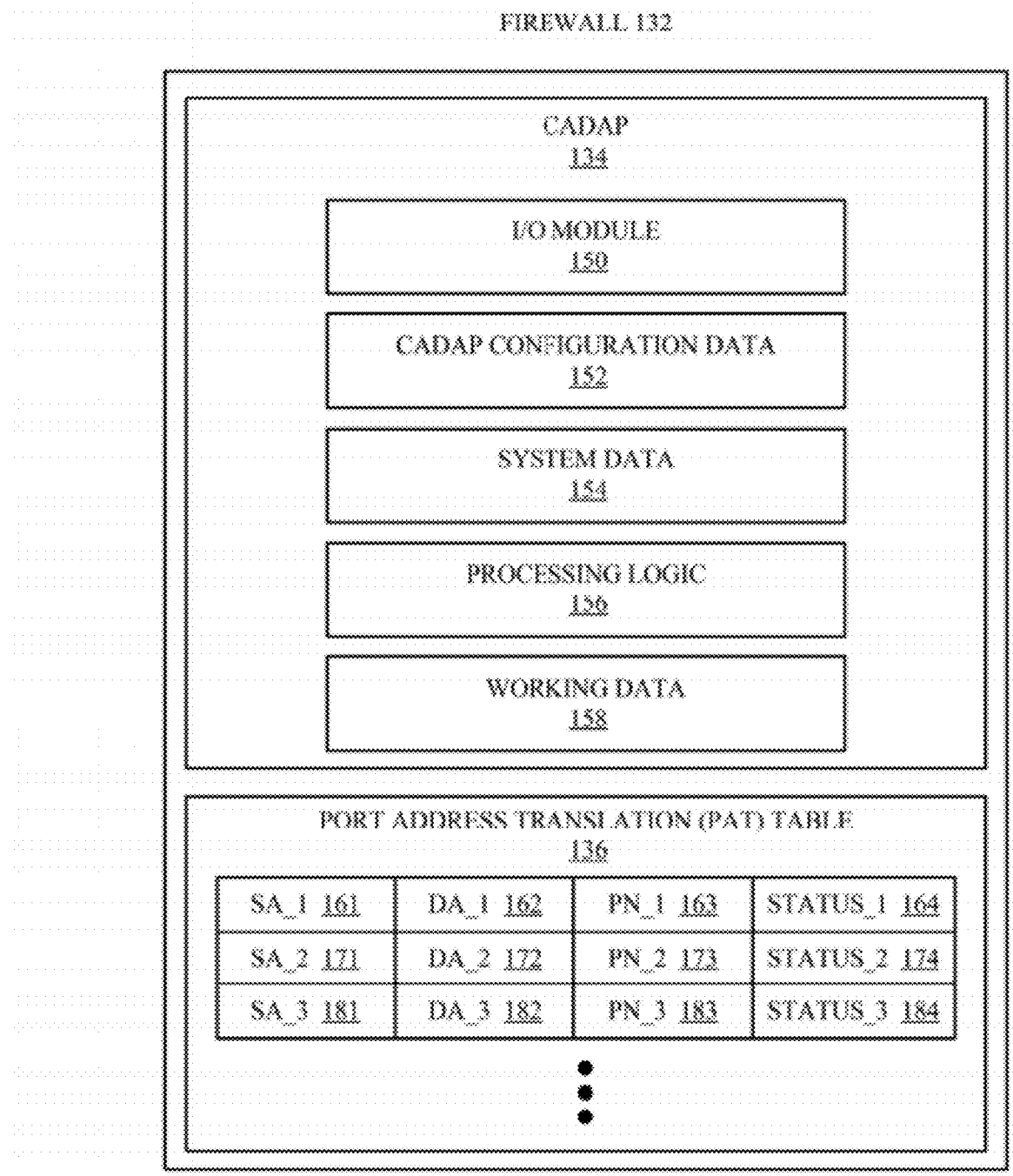
FIG. 2 is a block diagram of a Client-agnostic Attack Detection and Prevention module (CADAP) within a firewall, both introduced above in conjunction with FIG. 1, in more detail.

FIG. 2 is a block diagram of a Client-agnostic Attack Detection and Prevention module (CADAP) 134 within firewall 132, both introduced above in conjunction with FIG. 1, in more detail. Also illustrated within firewall 132 is PATT 136, first introduced in FIG. 1, in more detail. Data and logic associated with firewall 132 and CADAP 134 are stored on a CRSM (not shown) and executed on a processor (not shown). Although firewall 132 is illustrated as a stand-alone component in FIG. 1, firewall 132 may be incorporated into another device of private network 116 (FIG. 1), such as computer 122 (FIG. 1) or computer 124 (FIG. 1), and therefore use any CRSM and processor associated with those devices.

CADAP 134 includes an Input/Output (I/O) module 150, a CADAP configuration data section 152, a system data section 154, processing logic 156 and a working data section 158. I/O module 150 provides means for interaction with CADAP 134 as well as handling any communication between CADAP 134 and other components of firewall 132 and computing system architecture 100 (FIG. 1). CADAP configuration data 152 stores data that enable CADAP 134 to be administratively configured. Examples of types of configuration options include, but are not limited to, a number of incorrect attempts to reach service within private network 116 before an external host is deemed a threat and identification of particular services within private network 116 that are "trusted" and therefore not subject to the disclosed verification procedures.

System data 154 stores information on various components of fire wall 132, computing system architecture 100 and private network 116. Such information may be administratively configured or entered by means of discovery processes. Such information may include, but is not limited to, the identity of trusted components outside of private network 116 and information to enable CADAP 134 to configure firewall 132 to enable message processing according to the claimed subject matter. Processing logic 156 stores executable logic that controls the operation of CADAP 134. Working data 158 stores data relating to on-going processing such as the results of intermediate calculations.

Also illustrated is PATT 136, which in this example includes various data entries. A first data entry includes a field for storage of a source address, or SA_1 161, a destination address, or DA_1 162, a port number, of PN_1 163 and a status variable, or status_1 164. In a similar fashion, a second entry includes a SN_2 171, a DA_2 172, a PN_2 173 and a status_2 174. Also shown is a third entry with a SN_3 181, a DA_3 182, a PN_3 183 and a status_3 184. It should be noted that there would typically be many more entries in PATT 136 but for the sake of simplicity only three are illustrated. The components 150, 152, 154, 156 and 158 as well as various components of PATT 136 are described in more detail below in conjunction with FIGS. 3 and 4.

Figure 3:
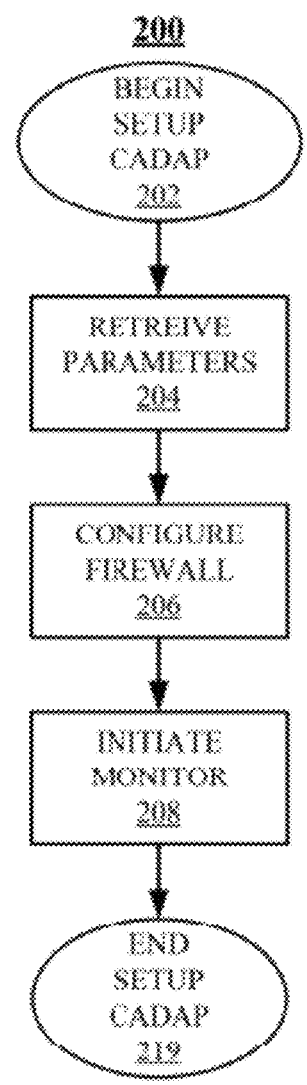
FIG. 3 is an example of a flowchart of a Setup CADAP process that may implement aspects of the claimed subject matter.

FIG. 3 is an example of a flowchart of a Setup CADAP process 200 that may implement aspects of the claimed subject matter. In the following example, data and logic associated with process 200 are stored on a CRSM (not shown) and executed on a processor (not shown) of CADAP 124 (FIGS. 1 and 2) of firewall 132 (FIG. 1 and 2). As explained above in conjunction with FIG. 2, although firewall 132 is illustrated as a stand-alone component in FIG. 1, firewall 132 may be incorporated into another device of private network 116 (FIG. 1), such as computer 122 (FIG. 1) or computer 124 (FIG. 1), and therefore data and logic associated with process 200 may be stored and executed on any CRSM and processor, respectively, associated with those devices.

Processing associated with process 200 starts in a "Begin Setup CADAP" block 202 and proceeds immediately to a "Retrieve Parameters" block 204. During processing associated with block 204, parameters for controlling the operation of CADAP 124 are retrieved form memory (see 152 and 154, FIG. 2). During processing associated with a "Configure Firewall" block 206, parameters retrieved during processing associated with block 204 are employed to configure firewall 132 so that any incoming and outgoing packets can be examined according to the disclosed techniques (see 250, FIG. 4). During processing associated with an "Initiate Monitor" block 208, an operation process that implements the claimed functionality associated with CADAP 124 is initiated (see 250, FIG. 4). Finally, during processing associated with an "End Setup CADAP" block 219, process 200 is complete.

Figure 4:
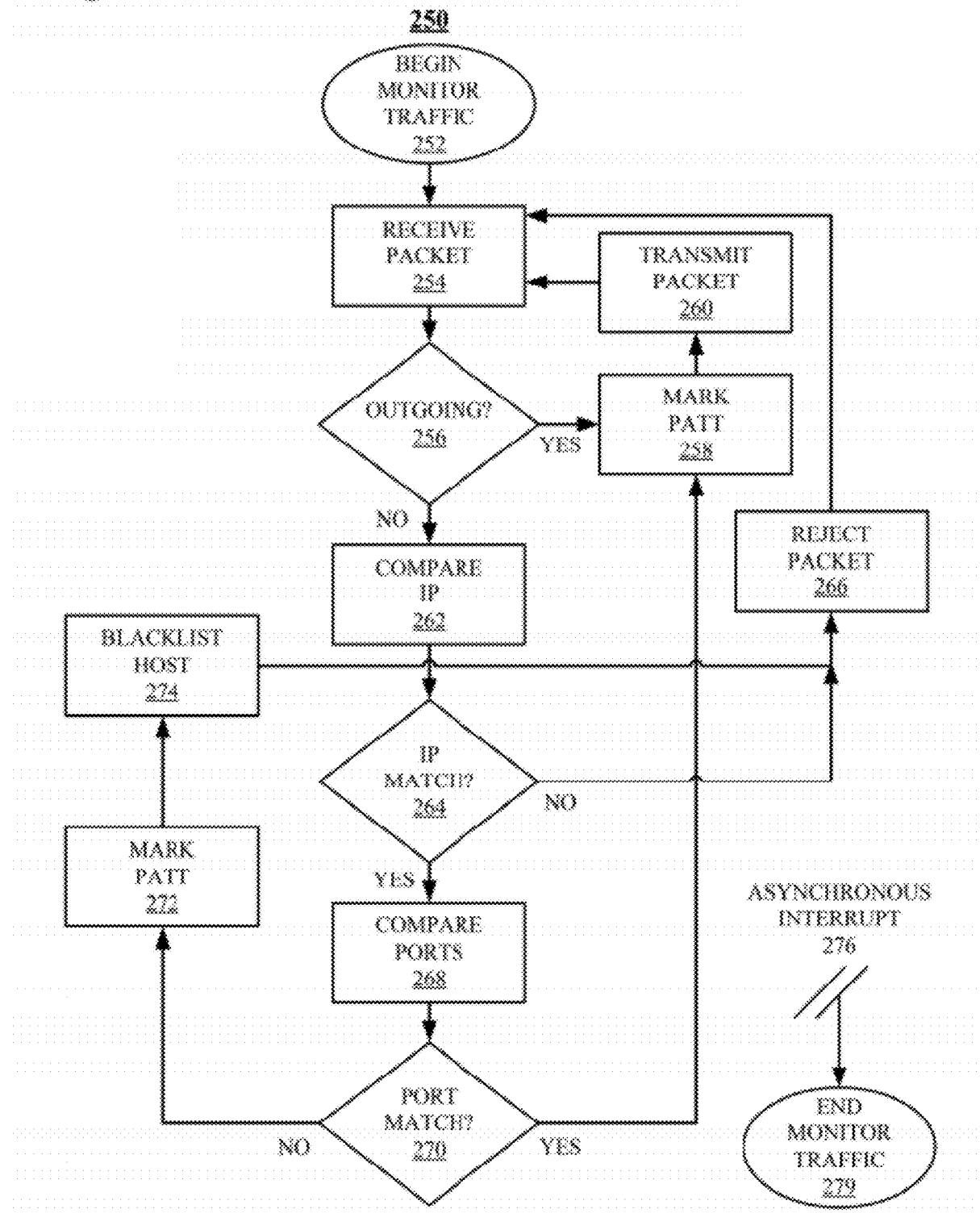
FIG. 4 is an example of a flowchart of a Monitor Traffic process that may implement aspects of the claimed subject matter.

FIG. 4 is an example of a flowchart of a Monitor Traffic process 250 that may implement aspects of the claimed subject matter. Like Setup CADAP process 200 (FIG. 3), in the following example, data and logic associated with process 250 are stored on a CRSM (not shown) and executed on a processor (not shown) of CADAP 124 (FIGS. 1 and 2) of firewall 132 (FIG. 1 and 2).

Processing associated with process 250 starts in a "Begin Monitor Traffic" block 252 and proceeds immediately to a "Receive Packet" block 254. During processing associated with block 254, packets transmitted via firewall 132 (FIGS. 1 and 2) are processed. In other words, data traffic through firewall 132 is monitored for both incoming packets, i.e. packets originating outside private network 116 (FIG. 1), and outgoing packets, i.e. packets originating inside private network 16. When a packet is received, control proceeds to an "Outgoing?" block 256. During processing associated with block 256, a determination is made as to whether the packet received during processing associated with block 254 is an incoming or outgoing packet.

If the received packet is outgoing, control proceeds to a "Mark Port Address Translation Table (PATT)" block 258. During processing associated with block 258, an entry associated the IP address of the internal host of the host from which the packet originated is made in PATT 136 (FIGS. 1 and 2) that notes a port number to which any response to the received packet is be addressed. In addition, the entry is marked with an appropriate code that identifies a "POTENTIAL ATTACK THREAT" (see 164, 174, and 184; FIG. 2). During processing associated with a "Transmit Packet" block 260, the packet received during processing associated with block 254 is transmitted to a device associated with the destination IP address.

If, during processing associated with block 256, a determination is made that the packet received during processing associated with block 254 is not an outgoing packet, i.e. an incoming packet, control proceeds to a "Compare IP" block 262. During processing associated with block 262, the destination IP address on the received packet is compared to entries in PATT 136. During processing associated with an "IP Match?" block 264 a determination is made as to whether or not the destination IP address matches any entries in PATT 136. If not, indicating that there is no corresponding address in private network 116, control proceeds to a "Reject Packet" block 266. During processing associated with block 266, appropriate measures are taken to process an undeliverable packet, such as but not limited to, notifying an administrator of private network 116 and perhaps the sender of the packet.

If, during block 264, an IP match is made, control proceeds to a "Compare Ports" block 268. During processing associated with block 268, a destination port specified on the incoming packet is compared with entries in PATT 136 for the destination IP address. During processing associated with a "Port Match?" block 270, a determination is made as to whether or not there is an entry in PATT 136 corresponding to the destination IP address that matches the destination port. If so, during processing associated with "Mark PATT" 258, the entry is marked with an appropriate code that indicates that the packet is a "NON THREAT." During processing associated with block 260, the incoming packet is then routed to the destination IP address and port.

If, during block 270, a determination is made that the destination port does not correspond to an entry corresponding to the destination IP address in PATT 136, control proceeds to a "Mark PATT" block 272. During processing associated with "Mark PATT" 272, the entry is marked with an appropriate code that indicates that the packet is a "THREAT DETECTED." During processing associated with a "Blacklist Host" block 274, the entries in PATT 136 corresponding to the internal host of the destination IP address are marked with an appropriate code to indicate that incoming communication for the internal host is disabled. Control then proceeds to Reject Packet block 266 and processing continues as described above.

Finally, process 250 is halted by means of an asynchronous interrupt 276, which passes control to an "End Monitor Traffic" block 279 in which process 250 is complete. Interrupt 276 is typically generated when CADAP 134 or firewall 136 is halted, either because of administrative action or the result of a power down. During normal operation, process 250 continuously loops through the blocks 254, 256, 258, 260, 262, 264, 266, 268, 270, 272 and 274, processing packets as they are received.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method for providing computer security, comprising:
examining a packet to determine whether the packet is an incoming packet or an outgoing packet, wherein the packet corresponds to a source internet protocol (IP) address, a destination IP address and a port number;
processing an outgoing packet, comprising storing in a table, in conjunction with the source IP address and the port number, an indication that the source IP address represents a potential threat; and
processing an incoming packet, comprising:
correlating the destination IP address and port number with source IP address and port numbers, respectively of entries in the table; and
if the destination IP address and the port number match a source LP address and port number of an entry in the table, storing, in conjunction with all entries in the table with a source IP address corresponding to the destination IP address, an indication that the source IP represents a non-threat; and if the destination IP address matches a source IP address and the port number does not correlate to a corresponding port number, storing, in conjunction with all entries in the table with a source IP address corresponding to the destination, an indication that the source IP address represents a threat.

2. The method of claim 1, the processing of the incoming packet further comprising blacklisting the source IP address if the destination IP address and the port number do not correlate with a source IP address and port number of an entry in the table.

3. The method of claim 1, the processing of the incoming packet further comprising preventing transmission of the packet to the destination IP address if the destination IP address has been indicated as a threat.

4. The method of claim 1, the processing of the incoming packet further comprising transmitting the packet to the destination IP address and port number if the destination IP address is stored in conjunction with an indication that the destination is a non-threat.

5. The method of claim 1, wherein the packet is received and the method is implemented at a firewall.

6. The method of claim 5, wherein the packet is received at the firewall via a network.

7. The method of claim 1, wherein the table is a port address translation (PAT) table.

\* \* \* \* \*